(12) United States Patent
Oura et al.

(10) Patent No.: US 6,723,473 B1
(45) Date of Patent: Apr. 20, 2004

(54) NONAQUEOUS ELECTROLYTE SECONDARY CELL

(75) Inventors: Takafumi Oura, Hirakata (JP); Kazuya Iwamoto, Sakai (JP); Shinji Nakanishi, Hirakata (JP); Atsushi Ueda, Osaka (JP); Hizuru Koshina, Neyagawa (JP)

(73) Assignees: Matsushita Electric Industrial Co., Ltd., Osaka (JP); Mitsubishi Chemical Corporation, Toyko (JP)

( * ) Notice: Subject to any disclaimer, the term of this patent is extended or adjusted under 35 U.S.C. 154(b) by 216 days.

(21) Appl. No.: 09/959,967
(22) PCT Filed: Jun. 29, 2000
(86) PCT No.: PCT/JP00/04293
§ 371 (c)(1), (2), (4) Date: Nov. 14, 2001
(87) PCT Pub. No.: WO01/03228
PCT Pub. Date: Jan. 11, 2001

(30) Foreign Application Priority Data

Jul. 2, 1999 (JP) .......................................... 11/188740

(51) Int. Cl.[7] ................................................. H01M 6/16
(52) U.S. Cl. ........................ 429/329; 429/330; 429/331; 429/231.1; 429/231.8; 429/231.4
(58) Field of Search ................................. 429/329, 330, 429/331, 231.1, 231.8, 231.4

(56) References Cited

FOREIGN PATENT DOCUMENTS

| | | |
|---|---|---|
| EP | 0766332 A1 | 4/1997 |
| EP | 0997 960 A2 * | 5/2000 |
| JP | 07220756 | 8/1995 |
| JP | 07282846 | 10/1995 |
| JP | 08096852 | 4/1996 |
| JP | 10312825 | 11/1998 |
| JP | 2000021442 | 1/2000 |

* cited by examiner

*Primary Examiner*—Laura Weiner
(74) *Attorney, Agent, or Firm*—Stevens, Davis, Miller & Mosher, LLP

(57) ABSTRACT

In a non-aqueous electrolyte secondary battery, a cyclic carboxylic acid ester having a high conductivity in a low-temperature environment is used as an electrolyte, and, furthermore, a cyclic carbonic acid ester having at least one carbon-carbon unsaturated bond is added thereto for the inhibition of reductive decomposition of the cyclic carboxylic acid ester.

9 Claims, 1 Drawing Sheet

NONAQUEOUS ELECTROLYTE SECONDARY CELL

TECHNICAL FIELD

The present invention relates to an improvement of non-aqueous solvents used for non-aqueous electrolytes of non-aqueous electrolyte secondary batteries, and particularly to an improvement of charge and discharge characteristics in a low-temperature environment.

BACKGROUND ART

Recently, electronic devices such as personal computers and portable telephones of miniature and light-weight type or cordless type have been rapidly developed, and secondary batteries having high energy density have been demanded as electric sources for driving these devices. Among them, non-aqueous electrolyte secondary batteries using lithium as an active material are expected much as batteries having high voltage and high energy density. Hitherto, in these batteries, metallic lithium is used for the negative electrode and molybdenum disulfide, manganese dioxide, vanadium pentoxide or the like is used for the positive electrode, and batteries on the level of 3 V have been realized.

However, when metallic lithium is used for the negative electrode, dendrite lithium is precipitated during charging, and the dendrite lithium deposited on the electrode plate is released from the electrode plate with repetition of charging and discharging, is suspended in the electrolyte, and contacts with the positive electrode to cause a minute short-circuit. As a result, the charging and discharging efficiency becomes lower than 100%, and the cycle life is shortened. Moreover, the dendrite lithium is large in surface area and high in reaction activity, and, hence, has a problem in safety.

In an attempt to solve these problems, recently, researches have been intensively conducted on lithium ion secondary batteries in which a carbon material is used in place of the metallic lithium and a lithium-containing transition metal oxide which shows a voltage of 4 V level for lithium, such as $LiCoO_2$, $LiNiO_2$ and $LiMn_2O_4$, or the like is used for positive electrode, and some of them have already been marketed. In these batteries, since lithium is present in the state of being absorbed in carbon in the negative electrode, the dendrite lithium seen in the conventional negative electrode using metallic lithium is not precipitated and safety is markedly improved.

As mentioned above, in non-aqueous electrolyte secondary batteries, especially, lithium ion secondary batteries, characteristics of positive electrode and negative electrode are naturally important, but characteristics of non-aqueous electrolyte which carries lithium ion are also important for obtaining satisfactory characteristics of the batteries. As non-aqueous solvents constituting the non-aqueous electrolytes, ordinarily, a solvent of high dielectric constant which is high in dissolvability for electrolyte and a solvent of low viscosity which is high in carrying ability of electrolyte ion are used in combination. For example, high conductivity can be provided by electrolytes comprising a mixture of cyclic carbonic acid esters such as ethylene carbonate (hereinafter sometimes referred to as "EC") and propylene carbonate (hereinafter sometimes referred to as "PC") which are solvents of high dielectric constant and non-cyclic carbonic acid esters such as dimethyl carbonate (hereinafter sometimes referred to as "DMC"), diethyl carbonate (hereinafter sometimes referred to as "DEC") and ethyl methyl carbonate (hereinafter sometimes referred to as "EMC"), and these electrolytes have been widely used.

DISCLOSURE OF INVENTION

However, EC has a high freezing point of about 38° C., and when it is used alone, the freezing point decreases to about 0° C. at the lowest even in expectation of freezing point depression caused by mixing with a solute. Therefore, it is attempted to ensure the low-temperature characteristics by mixing with a solvent of low viscosity and low freezing point. However, this mixed solvent contains EC and is affected by EC not a little, and thus sufficient low-temperature characteristics cannot still be ensured. Then, there is proposed an electrolyte using PC which is another cyclic carbonic acid ester having a low freezing point of −49° C. and a high dielectric constant. Although this electrolyte is improved in low-temperature characteristics as compared with the electrolyte using EC, it is still insufficient in low-temperature characteristics even if it is used in admixture with other solvents. Furthermore, when it is used in batteries in which a graphite of high crystallinity is used for negative electrode, there is a problem that PC is decomposed with this graphite.

Furthermore, cyclic carboxylic acid esters are proposed as solvents of high dielectric constant substitutable for the cyclic carbonic acid esters. As the cyclic carboxylic acid esters, for example, γ-butyrolactone has a low freezing point of −45° C. like PC and has a high dielectric constant, and, besides, is much higher than PC in conductivity at low temperatures. Therefore, this solvent is a very preferable solvent for lithium batteries. However, cyclic carboxylic acid esters readily undergo reductive decomposition and decomposes at a potential of negative electrode during charging when materials of low potential such as graphite are used for negative electrode. Thus, there are problems that irreversible capacity increases and charging and discharging efficiency decreases.

The object of the present invention is to solve the above problems and provide non-aqueous electrolyte secondary batteries excellent especially in charging and discharging characteristics at low temperatures.

As a result of intensive research conducted by the inventors, it has been found that an electrolyte applicable to non-aqueous electrolyte secondary batteries and giving excellent low-temperature characteristics can be obtained by adding to a cyclic carboxylic acid ester a cyclic carbonic acid ester having at least one carbon-carbon unsaturated bond.

That is, the present invention is a non-aqueous electrolyte secondary battery containing a positive electrode, a negative electrode and a non-aqueous electrolyte where the non-aqueous electrolyte contains a solute and a non-aqueous solvent, and the non-aqueous solvent contains a cyclic carboxylic acid ester and a cyclic carbonic acid ester having at least one carbon-carbon unsaturated bond.

The inventors consider that the excellent low-temperature characteristics according to the present invention are obtained for the following reasons, although they do not intend to suffer restriction by a specific theory.

According to Aurbach et al, "J. Electrochem. Soc., 138, 3529) and others, it is considered that a cyclic carbonic acid ester such as EC undergoes ring-opening and is dimerized at the time of reduction, thereby forming a film (passive state layer) on the surface of negative electrode, and this film acts as a physical barrier which inhibits insertion of solvent molecules around lithium ions. The above literature makes no mention of cyclic carbonic acid esters having unsaturated bond.

JP-A-11-31525 reports an electrolyte containing γ-butyrolactone (hereinafter sometimes referred to as "GBL") to which EC is added. However, according to the experiments conducted by the inventors, it has been found that this electrolyte though containing EC does not form the effective physical barrier reported by Aurbach et al.

As a result of investigations conducted by the inventors on various materials, it has been found that it is preferred to add not the cyclic carbonic acid esters having no carbon-carbon unsaturated bond, such as EC, but the cyclic carbonic acid esters having carbon-carbon unsaturated bond, such as vinylene carbonate (hereinafter referred to as "VC") to cyclic carboxylic acid esters such as GBL which readily undergo reductive decomposition. In the case of these esters having carbon-carbon unsaturated bond, polymerization first occurs at the unsaturated bond site and then the ring-opening dimerization seen in the case of EC proceeds, and, hence, it is considered that the film formed on the surface of negative electrode becomes denser and stronger than in the case of using EC. That is, it is considered that the effective physical barrier is formed to effectively inhibit the reductive decomposition of cyclic carboxylic acid esters such as GBL.

Examples of adding VC to electrolytes are reported in JP-A-6-84542 and JP-A-8-45545, but, in these examples, VC is added to cyclic carbonic acid esters having a high freezing point, such as EC, and they do not disclose addition of VC to cyclic carboxylic acid esters.

As mentioned above, according to the present invention, non-aqueous electrolyte secondary batteries having a very high conductivity even at low temperatures, especially excellent in charging and discharging characteristics in low-temperature environment can be provided by constituting the electrolyte by adding cyclic carbonic acid esters having carbon-carbon unsaturated bond to cyclic carboxylic acid esters. Particularly, even in the batteries using for negative electrode a graphite which cannot hitherto be used because it decomposes cyclic carboxylic acid esters, the electrolytes containing cyclic carboxylic acid esters can be used and improvement of low-temperature characteristics can be attained.

BEST MODE FOR CARRYING OUT THE INVENTION

Figure 1:
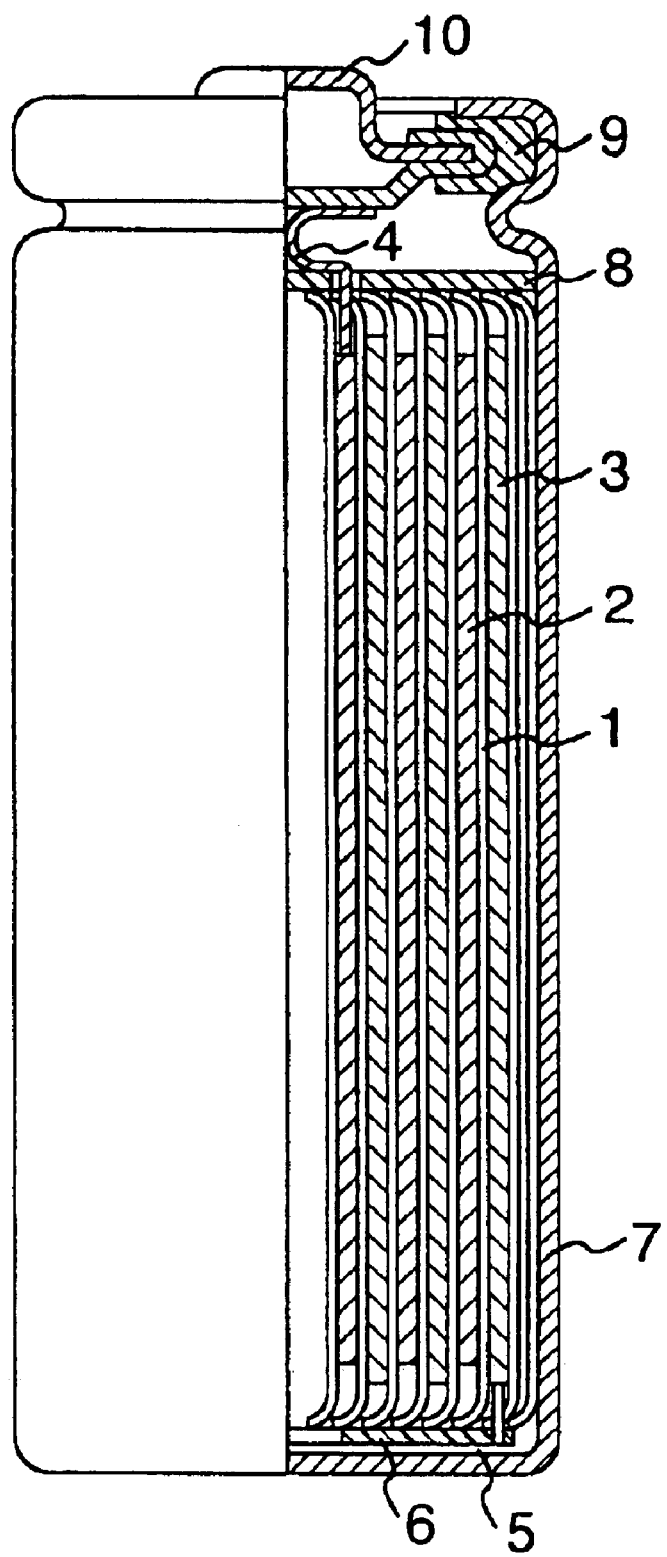
FIG. 1 is a longitudinal sectional view of the cylindrical lithium ion secondary battery in the examples of the present invention.

Specific embodiments of the present invention will be explained below.

The non-aqueous electrolyte secondary battery of the present invention is characterized in that a solvent comprising a cyclic carboxylic acid ester and a cyclic carbonic acid ester having at least one carbon-carbon unsaturated bond is used as a solvent having a high dielectric constant and especially excellent in charging and discharging characteristics in low-temperature environment.

The cyclic carboxylic acid esters are preferably γ-butyrolactone and its derivatives represented by the following formula (1).

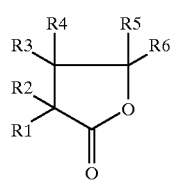

(1)

In the formula (1), R1 to R6 independently of one another are each hydrogen, halogen, an alkyl group of 1–6 carbon atoms or an acetyl group, and R4 and R5 may form a double bond together.

In this specification, the term "alkyl group" means an aliphatic hydrocarbon group, and may be either saturated or unsaturated group, which include alkylene groups such as methylene group.

As examples of preferred cyclic carboxylic acid esters, mention may be made of γ-butyrolactone, γ-valerolactone, α-acetyl-γ-butyrolactone, α-methyl-γ-butyrolactone, β-methyl-γ-butyrolactone, α-angelicalactone, α-methylene-γ-butyrolactone, γ-hexanolactone, γ-nonanolactone, γ-octanolactone, γ-methyl-γ-decanolactone, and the like. More preferred are γ-butyrolactone, γ-valerolactone and α-methyl-γ-butyrolactone.

The freezing point of these cyclic carboxylic acid esters is preferably 0° C. or lower, more preferably −20° C. to −60° C.

The unsaturated bond of the cyclic carbonic acid esters having at least one carbon-carbon unsaturated bond does not include an aromatic double bond. The number of the unsaturated bond is not limited, but is preferably 1–3, more preferably 1–2, especially preferably 1.

The cyclic carbonic acid esters having carbon-carbon unsaturated bond include vinylene carbonate, vinylethylene carbonate and derivatives thereof, and as examples thereof, mention may be made of vinylene carbonate (VC), 3-methylvinylene carbonate, 3,4-dimethyvinylene carbonate, 3-ethylvinylene carbonate, 3,4-diethylvinylene carbonate, 3-propylvinylene carbonate, 3,4-dipropylvinylene carbonate, 3-phenylvinylene carbonate, 3,4-diphenylvinylene carbonate, vinylethylene carbonate (hereinafter sometimes referred to as "VEC"), and the like. Preferred are vinylene carbonate and vinylethylene carbonate.

Content of the cyclic carbonic acid esters is preferably 0.5–20 vol % based on the cyclic carboxylic acid esters.

Since the cyclic carboxylic acid esters used in the present invention are lower in viscosity than cyclic carbonic acid esters such as EC and PC, suitable results can be obtained without further addition of non-cyclic carbonic acid esters such as DMC, DEC and EMC which are conventionally used solvents of low viscosity. However, addition of these non-cyclic esters is not excluded.

The electrolytes dissolved in the above non-aqueous solvents are not particularly limited in the present invention, and all of the electrolytes generally used in non-aqueous electrolyte batteries can be used. Examples thereof are $LiClO_4$, $LiAsF_6$, $LiPF_6$, $LiBF_4$, $LiCF_3SO_2$, $LiN(CF_3SO_2)_2$, $LiN(C_2F_6SO_2)_2$, $LiN(CF_3SO_2)$ $(C_4F_9SO_2)$, $LiB[C_6F_3(CF_3)_2-3,5]_4$, and the like.

On the other hand, as positive electrode and negative electrode of the batteries using the above non-aqueous electrolytes, there are used those which are generally used in these non-aqueous electrolyte secondary batteries. First, the materials for positive electrode are preferably mainly composed of composite oxides containing lithium and at least one transition metal (lithium-containing transition metal composite oxides). For example, suitable are active materials mainly composed of lithium-containing transition metal composite oxides represented by $Li_xMO_2$ (in which M denotes at least one transition metal, and x varies depending on charging and discharging state of batteries, and is usually $0.05 \leq x \leq 1.10$). In this $Li_xMO_2$, the transition metal M is preferably at least one of Co, Ni and Mn. In addition, as the lithium-containing transition metal composite oxides, there may be used those represented by $Li_xMn_2O_4$, and there are no special limitations in the present invention.

As the materials for negative electrode, there may be used metallic lithium and materials in which lithium can be doped and from which lithium can be dedoped. As examples of the materials in which lithium can be doped and from which lithium can be dedoped, mention may be made of carbon materials such as pyrolytic carbons, cokes (such as pitch coke, needle coke and petroleum coke), graphites, glassy carbons, organic polymer compound calcination products (those which are obtained by calcining phenolic resin, furan resin and the like at a suitable temperature to carbonize them), carbon fibers, and active carbon, polymers such as polyacetylene, polypyrrole and polyacene, and lithium-containing transition metal oxides or transition metal sulfides such as $Li_{4/3}Ti_{5/3}O_4$ and $TiS_2$. Among them, carbon materials are suitable, and when, for example, carbon materials having a spacing of plane (002) of not more than 0.340 nm, namely, graphite, are used, energy density of the batteries is improved.

The materials for positive electrode and negative electrode are kneaded with a binder and a conducting agent, followed by working into electrode plates, and the binder and the conducting agent can be any of known ones.

Shape of batteries can be any of cylinder type, rectangular type, coin type, button type, large-sized type, and the like, and embodiments of positive electrode and negative electrode can be changed depending on the shape of the batteries.

EXAMPLES (Structure of the Produced Cell)

Examples of the present invention will be explained referring to the drawing.

FIG. 1 is a longitudinal sectional view of the cylindrical non-aqueous electrolyte secondary battery (diameter: 18 mm, total height: 65 mm) used in this example. As is clear from FIG. 1, strip-shaped positive electrode plate 2 and negative electrode plate 3 with a separator 1 being interposed between them are rolled into a spiral form a plurality of times to construct a plate group. A positive electrode lead plate 4 made of aluminum and a negative electrode lead plate 5 made of nickel are welded to the positive electrode plate 2 and the negative electrode plate 3,. respectively. The top and bottom of the plate group are fitted with a bottom insulating plate 6 made of polyethylene resin, the plate group is put in a nickel-plated iron battery case 7, and another end of the negative electrode lead plate 5 is spot-welded to the inner bottom of the battery case 7. A top insulating plate 8 made of polyethylene resin is disposed on the upper face of the plate group, then a groove is made at a given position of the opening part of the battery case 7, and a given amount of a non-aqueous electrolyte is poured into the case. Another end of the positive electrode lead plate 4 is spot-welded to the under face of a stainless steel sealing plate 10. The peripheral portion of which is fitted with a gasket 9 made of polypropylene resin, then the opening portion of the battery case 7 is fitted with the sealing plate 10 by means of the gasket 9, and the upper edge part of the battery case 7 is caulked to seal the battery case, thereby completing a battery.

The positive electrode was made in the following manner. $Li_2CO_3$ and $CO_3O_4$ were mixed and calcined at 900° C. for 10 hours to prepare an $LiCoO_2$ powder. 100 parts by weight of this powder was mixed with 3 parts by weight of acetylene black as a conducting agent and 7 parts by weight of polyethylene tetrafluoride as a binder, and 100 parts by weight of an 1% aqueous carboxymethyl cellulose solution based on the weight of the $LiCoO_2$ powder was added to the mixture, followed by stirring to prepare a positive electrode mix paste. The resulting positive electrode mix paste was coated on both sides of an aluminum foil of 30 μm in thickness as a collector and dried, and then this was rolled by pressure rollers, followed by cutting to a given size to make a positive electrode plate.

The negative electrode was made in the following manner. First, a flaky graphite ground and classified so as to give an average particle diameter of about 20 μm was mixed with 3 parts by weight of styrene/butadiene rubber as a binder, and the mixture was added to a 1% aqueous carboxymethyl cellulose solution in an amount of 100 parts based on the graphite, followed by stirring to prepare a negative electrode mix paste. This negative electrode mix paste was coated on both sides of a copper foil of 20 μm in thickness as a collector and dried, and then this was rolled by pressure roller, followed by cutting to a given size to make a negative electrode plate.

The strip-shaped positive electrode plate and negative electrode plate made as mentioned above, and a microporous polyethylene resin separator of 25 μm in thickness were rolled into a spiral form to make a plate group, which was inserted in the battery case. A non-aqueous electrolyte prepared by dissolving 1.5 mole/liter of $LiPF_6$ in the solvent prepared in each example was poured in the battery case, and the battery case was sealed.

Example 1

The above battery was made using as a solvent for the non-aqueous electrolyte a solvent prepared by adding 5 vol % of vinylene carbonate (VC) to γ-butyrolactone (GBL). The resulting battery is referred to as battery 1 of the present invention.

Comparative Example 1

The above battery was made using γ-butyrolactone (GBL) alone as a solvent for the non-aqueous electrolyte. The resulting battery is referred to as comparative battery 1.

Comparative Example 2

The above battery was made using as a solvent for the non-aqueous electrolyte a solvent prepared by adding 5 vol % of ethylene carbonate (EC) to γ-butyrolactone (GBL). The resulting battery is referred to as comparative battery 2.

The batteries of the present invention and the comparative batteries were subjected to constant current charging and discharging at a charging and discharging current of 300 mA, a cut-off potential of charge of 4.1 V and a cut-off potential of discharge of 3.0 V and at an environmental temperature of 20° C. Amount of the gas evolved in the battery after subjected to 3 cycles was measured. The results are shown in Table 1.

TABLE 1

|  | Battery 1 of the present invention | Comparative battery 1 | Comparative battery 2 |
| --- | --- | --- | --- |
| Amount of evolved gas | 1.2 cc | 21 cc | 17 cc |

As can be seen from Table 1, reductive decomposition of GBL occurred in the comparative battery 1 in which GBL alone was used as the solvent for the electrolyte, and amount of the evolved gas during charging and discharging increased much. The reductive decomposition of GBL could also be not inhibited in the comparative battery 2 in which a solvent comprising GBL and EC was used, and substantially no decrease was seen in the amount of evolved gas as compared with when EC was not added. On the other hand, it can be seen that in the case of the battery 1 of the present invention in which a solvent containing VC was used, the amount of the evolved gas in the battery markedly decreased, and reductive decomposition of GBL was inhibited. Thus, it can be seen that when an electrolyte comprising GBL and VC is used, the amount of the evolved gas can be greatly diminished as compared with when GBL is used alone or a mixture of GBL and EC is used.

In this example, the decomposition potential of VC was 1.5 V (vs. Li/Li$^+$), the reduction potential of GBL was 1.4 V (vs. Li/Li$^+$), and the reduction potential of EC was 1.0 V (vs. Li/Li$^+$), and decomposition of VC having a noble electrode potential preceded that of GBL in the case of the combination of VC and GBL, and, on the other hand, decomposition of GBL having a noble electrode potential preceded in the case of the combination of GBL and EC, and this might have had some influence on the above results.

Therefore, as the cyclic carbonic acid esters having carbon-carbon unsaturated bond of the present invention, preferred are those which having a nobler electrode potential than the cyclic carboxylic acid esters, for example, an electrode potential nobler 0.1. V or more.

Example 2

The batteries using the electrolytes shown in Table 2 were compared on discharging characteristics in a low-temperature environment. The test conditions were as follows. As for charging, constant current and constant voltage charging was carried out at a maximum current of 1050 mA for 2.5 hours with setting the upper limit voltage at 4.2 V at an environmental temperature of 20° C. As for discharging, constant current discharging of these batteries in charged state was carried out at a cut-off potential of discharge of 3.0 V and a discharging current of 1500 mA and at environmental temperatures of 20° C. and −20° C. The ratio of a discharge capacity at −20° C. to a discharge capacity at 20+ C. is referred to as capacity retention rate in a low-temperature environment. The capacity retention rates of the batteries using various electrolytes are shown in Table 2.

TABLE 2

| Batteries | Solvents (volume percentage) | Capacity retention rate (−20° C./20° C.) |
|---|---|---|
| Example | | |
| 11 | GBL + VC (5 vol %) | 74% |
| 12 | γ-valerolactone + VC (5 vol %) | 72% |
| 13 | α-acetyl-GBL + VC (5 vol %) | 67% |
| 14 | α-methyl-GBL + VC (5 vol %) | 72% |
| 15 | α-angelicalactone + VC (5 vol %) | 68% |
| 16 | α-methylene-GBL + VC (5 vol %) | 69% |
| 17 | GBL + VC (5 vol %) | 68% |
| 18 | γ-valerolactone + VEC (5 vol %) | 66% |
| 19 | α-acetyl-GBL + VEC (5 vol %) | 62% |
| 20 | α-methyl-GBL + VEC (5 vol %) | 67% |
| 21 | α-angelicalctone + VEC (5 vol %) | 63% |
| 22 | α-methylene-GBL + VEC (5 vol %) | 62% |
| Comparative Example | | |
| 23 | EC | Electrolyte froze at −20° C. |

TABLE 2-continued

| Batteries | Solvents (volume percentage) | Capacity retention rate (−20° C./20° C.) |
|---|---|---|
| 24 | EC/EMC = 25/75 | 35% |
| 25 | PC | Charging and discharging were impossible |
| 26 | PC + VC (5 vol %) | 40% |

When EC was used alone as the solvent for electrolyte, the electrolyte was high in freezing point and froze at −20° C., and the battery 23 did not operate. Therefore, the battery 24 was made using an electrolyte comprising a mixture with ethyl methyl carbonate (EMC) having a low freezing point. This battery was low in capacity retention rate, namely, about 35%, and was not sufficient in low-temperature characteristics. In the case of the battery 25 which used PC alone, since graphite was used for the negative electrode, PC was decomposed during charging, and the charge and discharge reaction could not be performed. In the case of the battery 26 which used an electrolyte additionally contained VC, decomposition of PC on the graphite was inhibited by the film formed on the surface of the negative electrode, and charging and discharging were possible. However, the capacity retention rate was low, namely, 40%, and sufficient low-temperature characteristics were not obtained as in the case of using an EC/EMC mixed solvent. On the other hand, the batteries 11–22 which used electrolytes comprising the cyclic carboxylic acid esters and the cyclic carbonic acid esters having carbon-carbon unsaturated bond had very high capacity retention rates of 62–74%, and were markedly improved in low-temperature characteristics as compared with the batteries which used the electrolytes comprising EC or PC alone or in combination with other solvents.

Example 3

It can be seen from the above results that low-temperature characteristics are remarkably improved by adding a cyclic carbonic acid ester having carbon-carbon unsaturated bond to a cyclic carboxylic acid ester. However, since VC has a high freezing point of 22° C., there is the possibility of low-temperature characteristics being deteriorated if the amount of VC added is too much. Therefore, an investigation was made on the mixing ratio of VC. GBL was used as the cyclic carboxylic acid ester, and discharge characteristics in low-temperature environment were compared with changing the amount of VC added. Test conditions were as follows. As for charging, constant current and constant voltage charging was carried out at a maximum current of 1050 mA for 2.5 hours with setting the upper limit voltage at 4.2 V at an environmental temperature of 20° C. As for discharging, constant current discharging of these batteries in the charged state was carried out at a cut-off potential of discharge of 3.0 V and a discharging current of 1500 mA and at environmental temperatures of 20° C. and −20° C. The ratio of a discharge capacity at −20° C. to a discharge capacity at 20° C. is referred to as capacity retention rate at low temperatures. The capacity retention rates of the batteries using various electrolytes in a low-temperature environment are shown in Table 3.

TABLE 3

| Batteries | Solvents | −20° C./20° C. |
|---|---|---|
| 31 | GBL + VC (0.1 vol %) | Charging and discharging were impossible |
| 32 | GBL + VC (0.5 vol %) | 65% |
| 33 | GBL + VC (1 vol %) | 70% |
| 34 | GBL + VC (5 vol %) | 74% |
| 35 | GBL + VC (10 vol %) | 68% |
| 36 | GBL + VC (20 vol %) | 63% |
| 37 | GBL + VC (30 vol %) | 40% |

It can be seen from Table 3 that in the battery 31 where amount of VC was 0.1 vol %, there was not formed a film sufficient to inhibit reductive decomposition of GBL, and charging and discharging reaction could not be sufficiently performed at both the temperatures. Moreover, in the case of the battery 37 where the amount of VC was 30 vol %, conductivity of the electrolyte at −20° C. lowered and, hence, the capacity retention rate at low temperatures decreased. Therefore, amount of VC to be added is suitably in the range of 0.5–20 vol % which was employed in the batteries 32–36 which showed good low-temperature characteristics.

In this example, only a part of compounds were used as the cyclic carboxylic acid esters and the cyclic carbonic acid esters having carbon-carbon unsaturated bond, but the present invention is not limited to only these compounds used in the examples.

INDUSTRIAL APPLICABILITY

As explained above, the present invention is characterized by using as electrolytes those which comprises cyclic carboxylic acid esters to which cyclic carbonic acid esters having at least one carbon-carbon unsaturated bond are added. In cyclic carbonic acid esters having carbon-carbon saturated bond, first, polymerization takes place at the unsaturated bond site at reductive decomposition, and then the ring-opening dimerization as seen in the case of EC. The passive state layer formed in this case is denser and stronger than the passive state layer seen in the case of EC, making it possible to inhibit the reductive decomposition of the cyclic carboxylic acid esters. As a result, it becomes possible to use as electrolytes cyclic carboxylic acid esters which have high dielectric constant, particularly improve charging and discharging characteristics at low temperatures and, especially, are usable in lithium ion secondary batteries using graphite for negative electrode. Thus, non-aqueous electrolyte secondary batteries excellent in characteristics can be provided.

What is claimed is:

1. A non-aqueous electrolyte secondary battery comprising a positive electrode, a negative electrode and a non-aqueous electrolyte where the non-aqueous electrolyte contains a solute and a non-aqueous solvent, and said non-aqueous solvent comprises a cyclic carboxylic acid ester and a cyclic carbonic acid ester having at least one carbon-carbon unsaturated bond.

2. A non-aqueous electrolyte secondary battery according to claim 1, wherein the cyclic carboxylic acid ester is at least one compound selected from the group consisting of γ-butyrolactone and its derivatives represented by the following formula (1):

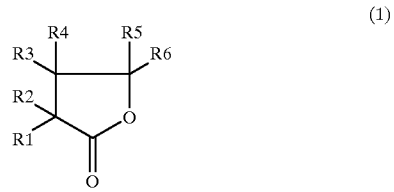

(1)

(in the formula, R1 to R6 independently of one another are each hydrogen, halogen, an alkyl group of 1–6 carbon atoms or an acetyl group, and R4 and R5 may form a double bond together).

3. A non-aqueous electrolyte secondary battery according to claim 1, wherein the cyclic carbonic acid ester is at least one compound selected from the group consisting of vinylene carbonate, vinylethylene carbonate and derivatives thereof.

4. A non-aqueous electrolyte secondary battery according to claim 1, wherein the proportion of the cyclic carbonic acid ester is 0.5–20 vol % based on the cyclic carboxylic acid ester.

5. A non-aqueous electrolyte secondary battery according to claim 1, wherein the electrolyte contains at least one cyclic carboxylic acid ester selected from the group consisting of γ-butyrolactone, γ-valerolactone and α-methyl-γ-butyrolactone and at least one cyclic carbonic acid ester selected from the group consisting of vinylene carbonate and vinylethylene carbonate, and the mixing proportion of the cyclic carbonic acid ester to the cyclic carboxylic acid ester is 0.5–20 vol %.

6. A non-aqueous electrolyte secondary battery according to any one of claims 1 to 5, wherein active material of the positive electrode is a lithium-containing transition metal oxide and material of the negative electrode is graphite.

7. A non-aqueous electrolyte secondary battery according to claim 1, wherein the proportion of the cyclic carbonic acid ester is greater than or equal to 0.5 and less than 20 vol % based on the cyclic carboxylic acid ester.

8. A non-aqueous electrolyte secondary battery according to claim 1, wherein the electrolyte contains at least one cyclic carboxylic acid ester selected from the group consisting of γ-butyrolactone, γ-valerolactone and α-methyl-γ-butyrolactone and at least one cyclic carbonic acid ester selected from the group consisting of vinylene carbonate and vinylethylene carbonate, and the mixing proportion of the cyclic carbonic acid ester to the cyclic carboxylic acid ester is greater than or equal to 0.5 and less than 20 vol %.

9. A non-aqueous electrolyte according to claim 1, wherein said non-aqueous solvent consists essentially of a cyclic carboxylic acid ester and a cyclic carbonic acid ester having at lest one carbon-carbon unsaturated bond.

* * * * *